(12) United States Patent
Yasuda et al.

(10) Patent No.: US 7,455,931 B2
(45) Date of Patent: Nov. 25, 2008

(54) NEGATIVE ELECTRODE FOR NON-AQUEOUS ELECTROLYTE SECONDARY CELL AND METHOD FOR MANUFACTURE THEREOF, AND NON-AQUEOUS ELECTROLYTE SECONDARY CELL

(75) Inventors: Kiyotaka Yasuda, Ageo (JP); Yoshiki Sakaguchi, Ageo (JP); Kazuko Taniguchi, Ageo (JP); Makoto Dobashi, Ageo (JP)

(73) Assignee: Mitsui Mining & Smelting Company, Ltd., Tokyo (JP)

( * ) Notice: Subject to any disclaimer, the term of this patent is extended or adjusted under 35 U.S.C. 154(b) by 812 days.

(21) Appl. No.: 10/512,453

(22) PCT Filed: Apr. 21, 2003

(86) PCT No.: PCT/JP03/05049

§ 371 (c)(1),
(2), (4) Date: Oct. 26, 2004

(87) PCT Pub. No.: WO03/092098

PCT Pub. Date: Nov. 6, 2003

(65) Prior Publication Data

US 2005/0175900 A1      Aug. 11, 2005

(30) Foreign Application Priority Data

Apr. 26, 2002 (JP) ............................. 2002-125812
May 23, 2002 (JP) ............................. 2002-148478
May 24, 2002 (JP) ............................. 2002-150401
Aug. 22, 2002 (JP) ............................. 2002-242607

(51) Int. Cl.
*H01M 4/58* (2006.01)
*H01M 4/02* (2006.01)

(52) U.S. Cl. .............................. 429/218.1; 429/231.95; 429/209

(58) Field of Classification Search ............ 429/231.95, 429/218.1, 209
See application file for complete search history.

(56) References Cited

U.S. PATENT DOCUMENTS 6,051,340 A * 4/2000 Kawakami et al. ..... 429/231.95

FOREIGN PATENT DOCUMENTS

| JP | 8-50922 | | 2/1996 |
| JP | 8-255610 | | 10/1996 |
| JP | 08255610 A | * | 10/1996 |
| JP | 9-283116 | | 10/1997 |

(Continued)

OTHER PUBLICATIONS

Hiroaki Ikeda et al., Preprints of the 42$^{nd}$ Battery Symposium in Japan, 2001, pp. 282-289.

*Primary Examiner*—Dah-Wei Yuan
*Assistant Examiner*—Zachary Best
(74) *Attorney, Agent, or Firm*—Young & Thompson

(57) ABSTRACT

An anode for a nonaqueous secondary battery comprising a current collector having formed thereon a first covering layer containing tin, a tin alloy, aluminum or an aluminum alloy and a second covering layer containing a metal having low capability of forming a lithium compound in that order. The anode may have an additional first covering layer formed on the second covering layer. A covering layer containing a copper etc. may be formed as an uppermost layer. Each layer can be formed by heat treating to get desired property. As heat treatment can be done in a short time, it has a great cost merit.

16 Claims, 5 Drawing Sheets

FOREIGN PATENT DOCUMENTS

| | | |
|---|---|---|
| JP | 10-106628 | 4/1998 |
| JP | 10106628 A * | 4/1998 |
| JP | 2001-68094 | 3/2001 |
| JP | 2001-68095 | 3/2001 |
| JP | 2001-256968 | 9/2001 |
| JP | 2002-289178 | 10/2002 |
| JP | 2003-157833 | 5/2003 |
| JP | 2003-162997 | 6/2003 |
| WO | WO 02/25757 | 3/2002 |

* cited by examiner

- Layer C (Cu)
- Layer A (Sn)
- Layer B (Cu)
- Layer A (Sn)

- Cu-rich Sn-Cu alloy layer (uppermost layer)
- Cu-rich Sn-Cu alloy layer (second covering layer)
- Sn-rich Sn-Cu alloy layer (first covering layer)

NEGATIVE ELECTRODE FOR NON-AQUEOUS ELECTROLYTE SECONDARY CELL AND METHOD FOR MANUFACTURE THEREOF, AND NON-AQUEOUS ELECTROLYTE SECONDARY CELL

TECHNICAL FIELD

This invention relates to an anode for nonaqueous secondary batteries which is capable of intercalating and deintercalating an alkali metal, such as lithium, and a process of producing the anode. More particularly, it relates to an anode for nonaqueous secondary batteries which has a specific structure to achieve a prolonged electrode life and a markedly increased energy density per unit volume and weight, a process of producing the anode, and a nonaqueous secondary battery using the anode.

BACKGROUND ART

With the spread of small portable electric and electronic equipment, small-sized and high-capacity nonaqueous secondary batteries have been extensively developed. The non-aqueous secondary batteries generally use lithium manganate, lithium cobaltate, lithium nickelate, etc. as a cathode material and a carbonaceous material, metallic lithium, etc. as an anode material.

It is difficult for the carbonaceous materials, the theoretical discharge capacity of which is as low as 372 mAh/g, to meet the increasing demands coping with the expected increase in power consumption accompanying the tendency of small electrical and electronic equipment toward multifunctionality.

Although metallic lithium has a theoretical discharge capacity as high as 3860 mAh/g, it involves the following problems. It undergoes deterioration due to reaction with the nonaqueous electrolytic solution. It grows dendritically from the anode through repetition of charge and discharge, and the dendrites ultimately penetrate the separator (insulator) to cause an internal short-circuit of the battery. The cycle life is therefore short.

To solve these problems, an anode comprising a current collector, such as a copper plate, laminated with a tin or tin alloy film by electroplating has been proposed (see JP-A-2001-68094, JP-A-2001-68095, and Preprints of The 45$^{th}$ Battery Symposium in Japan, p. 282, 284 & 288). Such an anode has a disadvantage that the tin or tin alloy film cracks with repetition of lithium intercalation and deintercalation and eventually falls off the current collector such as a copper plate, resulting in a failure to achieve prolongation of life. As In particular, formation of a current collector and plating with tin or a tin alloy are usually carried out separately, plating with tin or a tin alloy is proceeded after formation of an oxide film on the surface of the current collector. It follows that the tin or tin alloy film easily peels and falls off the current collector.

Additionally, an anode for nonaqueous secondary batteries has been required to have a high energy density per unit volume and unit weight.

DISCLOSURE OF THE INVENTION

An object of the present invention is to provide an anode for nonaqueous secondary batteries which has a prolonged electrode life and a markedly increased energy density per unit volume and weight, a process of producing the anode, and a nonaqueous secondary battery using the anode.

As a result of studies, the present inventors have found that the above object of the invention is accomplished by an anode comprising a current collector having formed thereon a first covering layer containing an element capable of intercalating lithium, such as tin, and a second covering layer containing a metal having low capability of forming a lithium compound.

Based on the above findings, the present invention provides an anode for a nonaqueous secondary battery comprising a current collector having formed thereon a first covering layer containing tin, a tin alloy, aluminum or an aluminum alloy and a second covering layer containing a metal having low capability of forming a lithium compound.

The present invention also provides a process of producing an anode for a nonaqueous secondary battery comprising successively depositing a first covering layer containing tin, a tin alloy, aluminum or an aluminum alloy and a second covering layer containing a metal having low capability of forming a lithium compound in that order on the surface of a current collector by electrolysis or a dry surface treatment and heating the covering layers at 120° to 350° C. for 10 minutes to 24 hours.

The present invention also provides a process of producing an anode for a nonaqueous secondary battery characterized by comprising successively depositing by electrolysis or a dry surface treatment a first covering layer containing tin, a tin alloy, aluminum or an aluminum alloy, a second covering layer containing a metal having low capability of forming a lithium compound, and a first covering layer that is the same or different from the first covering layer in that order on the surface of a current collector with a large number of slits to form a multilayer cover having fundamentally three layers and applying a tensile force to the resulting composite comprising the current collector and the multilayer cover in the outward directions to make holes of 2 mm or smaller in diameter at intervals of 1 mm or shorter in the multilayer cover.

The present invention also provides a process of producing an anode for a nonaqueous secondary battery characterized by comprising successively depositing by electrolysis or a dry surface treatment a first covering layer containing tin, a tin alloy, aluminum or an aluminum alloy, a second covering layer containing a metal having low capability of forming a lithium compound, and a first covering layer that is the same or different from the first covering layer in that order on the surface of a current collector by electrolysis or a dry surface treatment to form a multilayer cover having fundamentally three layers and applying laser light to the multilayer cover side of the resulting composite comprising the current collector and the multilayer cover to make holes of 2 mm or smaller in diameter at intervals of 1 mm or shorter in the multilayer cover.

The present invention also provides a process of producing an anode for a nonaqueous secondary battery characterized by comprising successively depositing by electrolysis or a dry surface treatment a first covering layer containing tin, a tin alloy, aluminum or an aluminum alloy, a second covering layer containing a metal having low capability of forming a lithium compound, and a first covering layer that is the same or different from the first covering layer in that order on the surface of a current collector to form a multilayer cover having fundamentally three layers and piercing the resulting composite comprising the current collector and the multilayer cover with pins from the multilayer cover side to make holes of 2 mm or smaller in diameter at intervals of 1 mm or shorter in the multilayer cover.

The present invention also provides a nonaqueous secondary battery using the above-described anode.

BEST MODE FOR CARRYING OUT THE INVENTION

Figure 1:
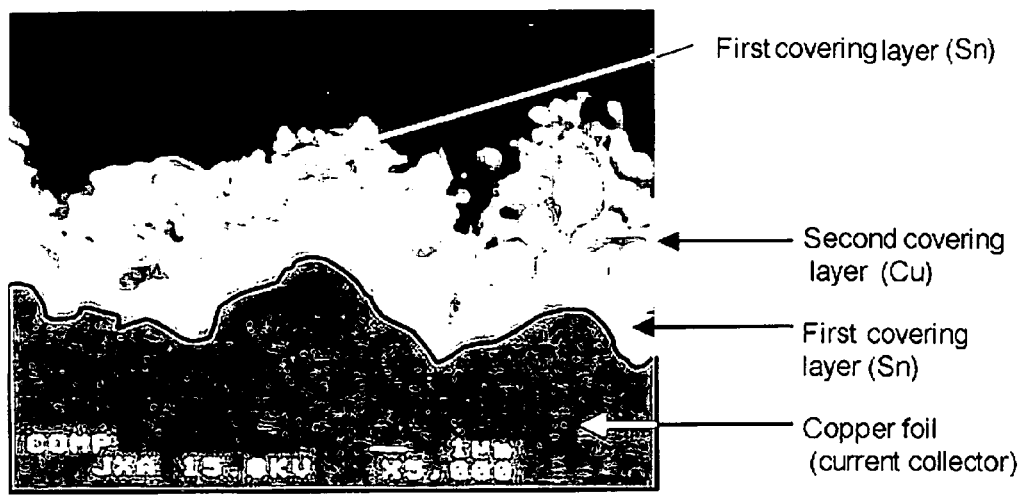
FIG. 1 is a composition image by a scanning electron microscope (SEM) on a cross-section of an anode for nonaqueous secondary batteries according to the present invention.

The present invention will be described in detail with reference to its embodiments. The current collector that is used in the anode for nonaqueous secondary batteries of the invention includes foil of electrically conductive materials, such as copper, nickel, and stainless steel. Copper foil, for example, for use as a current collector is obtained by electrolysis using a copper-containing solution and preferably has a thickness of 10 to 30 μm. The copper foil obtained by the method described in JP-A-2000-90937 is particularly preferred because of its extreme thinness with a thickness as small as 12 μm or less.

The anode of the invention has the above-mentioned current collector and a multilayer cover. The multilayer cover comprises a first covering layer containing tin, a tin alloy, aluminum or an aluminum alloy formed on the current collector and a second covering layer containing a metal having low capability of forming a lithium compound formed on the first covering layer.

As stated, the multilayer cover of the present invention essentially has at least two layers: one first covering layer and one second covering layer. Having the first covering layer covered with the second covering layer, the anode exhibits increased discharge capacity owing to the action of the first covering layer while effectively preventing the first covering layer from peeling or falling off. As a result, prolongation of the electrode life can be achieved. In another embodiment, the anode may have a three-layer structure having an additional first covering layer formed on the second covering layer. In this embodiment featuring a three-layer structure, the first covering layer formed on the current collector is prevented from peeling or falling more effectively to bring about further prolongation of the electrode life. In still another embodiment of the invention, one or more sets of a second covering layer and a first covering layer may be formed on the three-layer structure with the first covering layer of every set as an upper layer. That is, the multilayer cover may have a five-layer structure, a seven-layer structure, and so on as well as the three-layer structure. Materials may be the same or different between the two or more first covering layers and between the two or more second covering layers that constitute the multilayer cover.

Where the anode of the invention has the three-layer structure (first covering layer/second covering layer/first covering layer) or a more multiple structure having one or more sets of a second covering layer and a first covering layer provided on the three-layer structure, it is preferred that a covering layer containing a metal having low capability of forming a lithium compound be formed as an uppermost layer. For example, where the anode has the three-layer structure referred to above, it is preferred to further provide a covering layer containing a metal having low capability of forming a lithium compound on the upper first covering layer (i.e., the first covering layer formed on the second covering layer) to build up a four-layer structure. The covering layer containing a metal having low capability of forming a lithium compound which is formed as an uppermost layer suppresses oxidation of the first layer made of tin, etc. thereby to reduce irreversible capacity. This uppermost layer is also effective in preventing the first covering layer from falling off thereby improving the anode life. In order to ensure these effects, it is preferred that the uppermost covering layer containing a metal having low capability of forming a lithium compound be extremely thin with a thickness of 0.01 to 20 μm, still preferably 0.02 to 10 μm, particularly preferably 0.5 to 5 μm. The expression "low capability of forming a lithium compound" as used herein means that the metal has no capability of forming an intermetallic compound or a solid solution with lithium or, if any, the capability is such that the resulting lithium compound contains only a trace amount of lithium or is very unstable. Such metals include copper, iron, cobalt, chromium, and nickel. In contrast, metals having high capability of forming a lithium compound include tin, silicon, and aluminum. These metals form an intermetallic compound with lithium. In particular, use of copper as a metal with low capability of forming a lithium compound is advantageous for further securing prevention of oxidation and fall-off of the first covering layer, further reducing the irreversible capacity, and further improving the anode life characteristics.

The tin alloy in the first covering layer includes tin-bismuth, tin-iron, tin-cobalt, and tin-copper. The aluminum alloy includes aluminum-lithium, aluminum-manganese, aluminum-titanium, aluminum-chromium, aluminum-vanadium, and aluminum-copper. The first covering layer is preferably formed by electrolytic plating or a dry surface treatment. The thickness of the first covering layer is preferably 0.5 to 50 μm, still preferably 1 to 50 μm, particularly preferably 2 to 20 μm.

The second covering layer comprises a metal having low capability of forming a lithium compound. For the particulars of the metal having low capability of forming a lithium compound, the description about the uppermost covering layer comprising a metal having low capability of forming a lithium compound applies. Since the second covering layer containing a metal having low capability of forming a lithium compound plays a roll as a support of the first covering layer containing tin, etc., it contributes to the improvement of the cycle life characteristics against intercalation and deintercalation of lithium. From this point of view it is particularly preferred to use copper or nickel as a metal having low capability of forming a lithium compound. The second covering layer is obtained by, for example, electrolysis using a solution containing the metal. The thickness of the second covering layer is preferably 0.02 to 50 μm, still preferably 0.2 to 20 μm.

Figure 2:
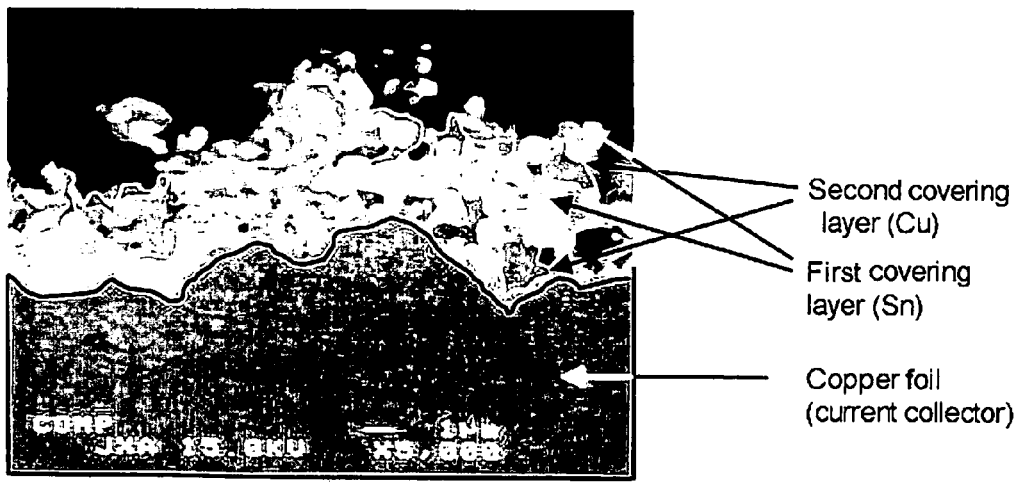
FIG. 2 is an SEM composition image of a cross-section of another anode for nonaqueous secondary batteries according to the present invention.

The second covering layer may cover the entire area of the first covering layer continuously or cover the first covering layer discontinuously. Actual examples of the second covering layer discontinuously covering the first covering layer are shown in FIGS. 1 and 2. FIGS. 1 and 2 each present a composition image, by a scanning electron microscope (SEM), of a cross-section of an anode having a three-layer structure, i.e., a first covering layer/a second covering layer/a first covering layer. In both figures, the first covering layers are made of tin, the second covering layer is made of copper, and the current collector is copper foil. For better understanding, the boundaries between the first covering layer and the second covering layer is traced for emphasis. As is apparent from these images, the first covering layer is continuously formed on the current collector, and the second covering layer is discontinuously formed thereon. The first covering layer formed on the second covering layer is discontinuous similarly to the second covering layer so that the underlying second covering layer can be exposed on the surface in parts where the upper first covering layer is separated. The discontinuous second covering layer is formed by, for example, appropriately choosing the electrolysis conditions for the formation of the second covering layer or properly controlling the surface roughness of the copper foil current collector. Otherwise, an anode with a continuous second covering layer is once prepared and then subjected to charge and discharge to cause the first covering layer formed on the current collector to expand and contract thereby changing the continuous second covering layer into a discontinuous layer. Where the second covering layer discontinuously covers the first covering layer, the discontinuous second covering layer provides paths for an electrolytic solution to penetrate.

In order to accelerate penetration of an electrolytic solution, making holes piercing through the covering layers is also advantageous. When the anode of the invention has a first covering layer, a second covering layer, and a first covering layer on the current collector in that order, it is preferred for the covering layers to have holes of 2 mm or smaller, desirably 500 µm or smaller, at intervals of 1 mm or smaller. In short, it is preferred for the three-layered cover to have through-holes. Such holes let in an electrolytic solution more smoothly so that each of the two first covering layers functions as an anode more efficiently. Besides, volumetric expansion and contraction can be relaxed by the holes.

Where the anode of the invention has a first covering layer, a second covering layer, and a first covering layer on the current collector in that order, it is preferred for the second covering layer to have fine random breaks at the interfaces with the adjacent lower and upper first covering layers at intervals of 2 mm or shorter. Such breaks further ensure effective utilization of the first covering layers as an anode. The breaks can be made whether or not the covering layers have through-holes.

Figure 3:
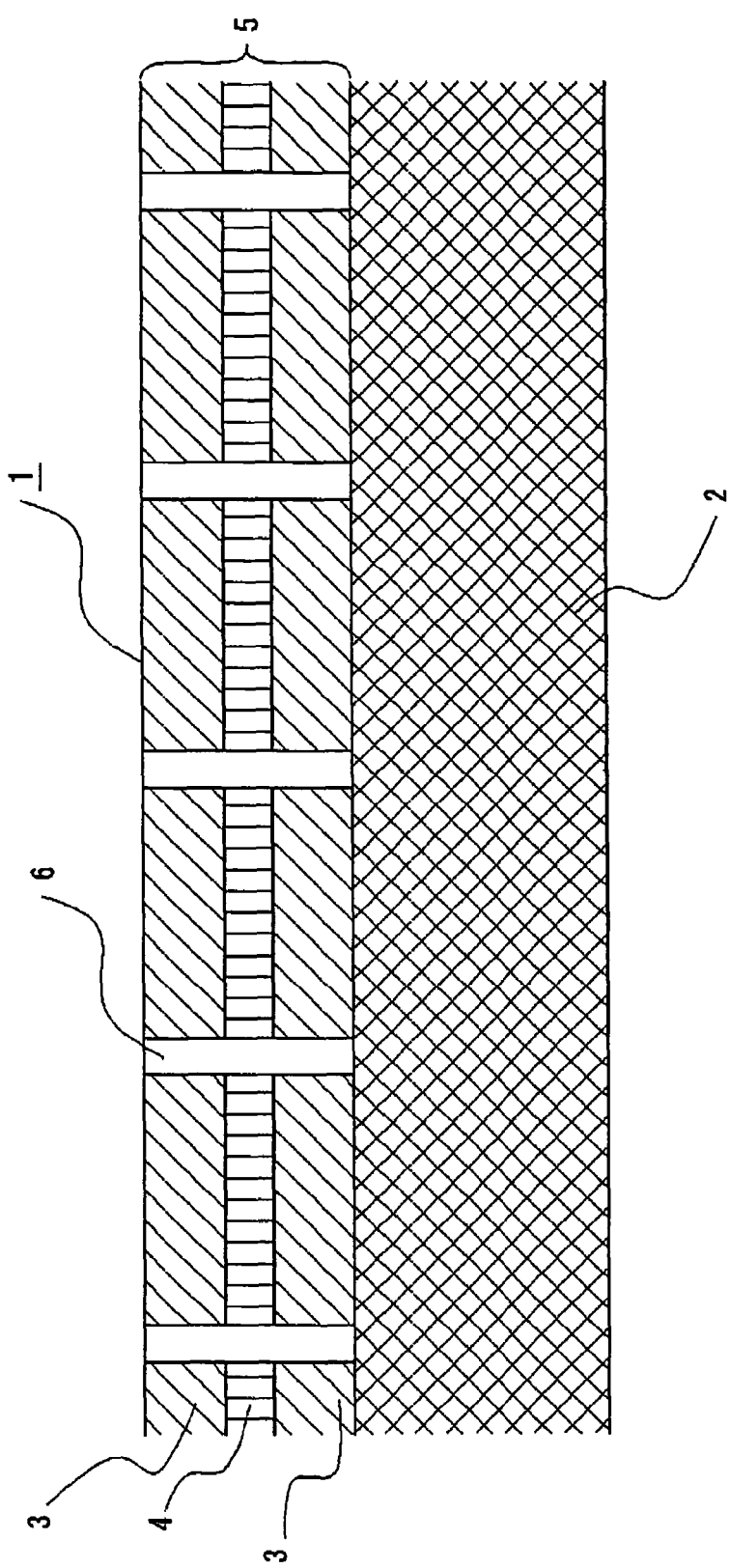
FIG. 3 is a schematic illustration of a cross-section of an anode for nonaqueous secondary batteries according to the present invention.
Figure 4:
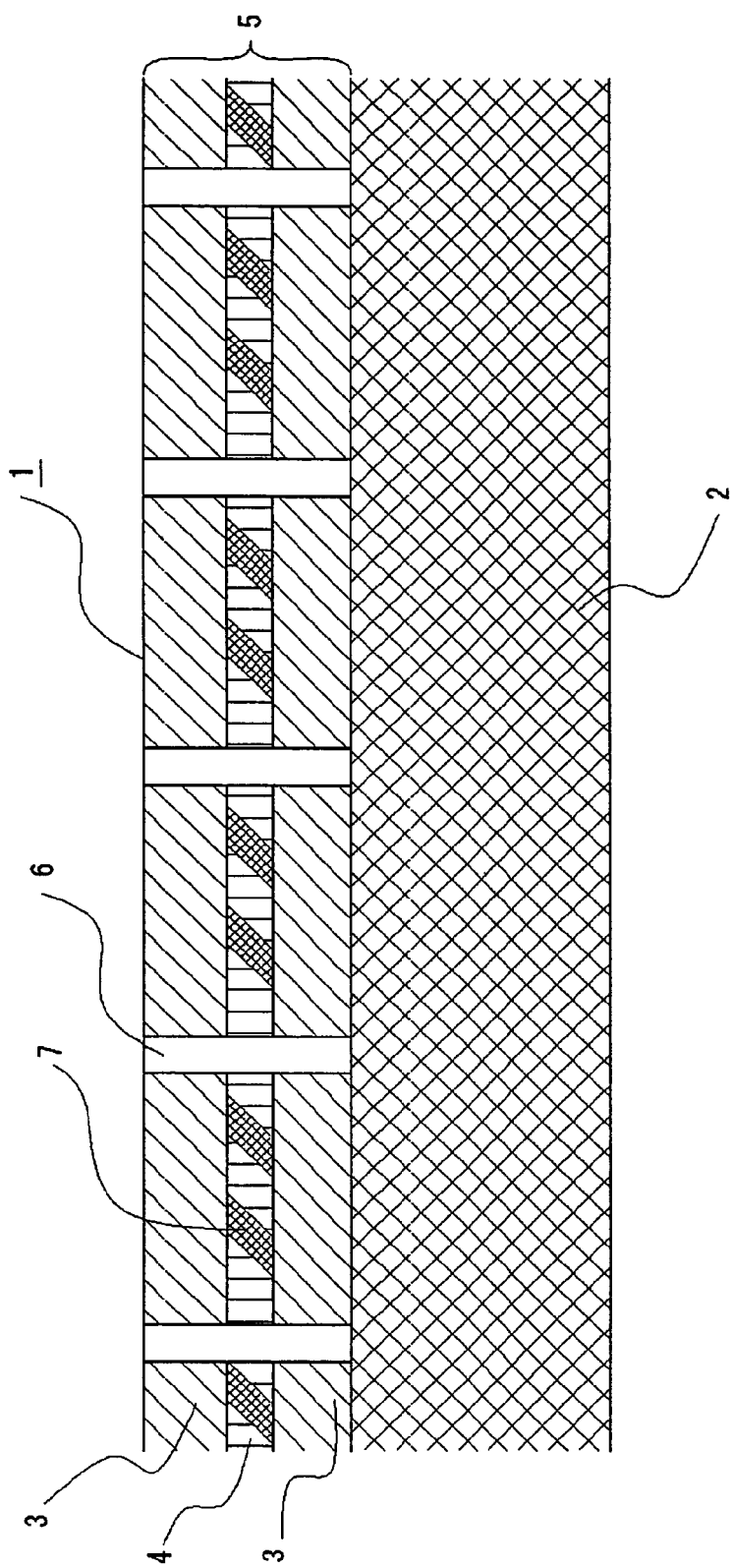
FIG. 4 is a schematic illustration of a cross-section of another anode for nonaqueous secondary batteries according to the present invention.

FIGS. 3 and 4 each schematically illustrate an example of the structure of the anode for nonaqueous secondary batteries according to the present invention. FIG. 3 is a schematic cross-section of an anode of the invention, and FIG. 4 is a schematic cross-section of another anode of the invention. As shown in FIGS. 3 and 4, the anode for a nonaqueous secondary battery is composed of a current collector (copper foil) 2 and a multilayer cover 5. The multilayer cover 5 has a three-layer structure composed of a first covering layer 3, a second covering layer 4, and another first covering layer 3. The multilayer cover 5 has holes 6 at a given interval. In FIG. 4, the second covering layer 4 has breaks 7 at its interfaces with the first covering layers 3. In both FIGS. 3 and 4 the second covering layer 4 is depicted as a continuous layer for the sake of simplicity. As mentioned supra, the second covering layer 4 may be a discontinuous layer.

In another embodiment of the anode for a nonaqueous secondary batteries of the invention, the first covering layer formed in contact with a current collector is made up of an alloy of tin or aluminum and an element constituting the second covering layer and/or an element constituting the current collector. Where, for instance, the current collector is copper foil, and the second covering layer contains copper, the first covering layer can be made of a tin-copper alloy. In this embodiment, the first covering layer has enhanced adhesion to the second covering layer and/or the current collector so that the active material is prevented from falling off. In still another preferred embodiment of the anode of the invention, the second covering layer is made of an alloy of a metal having low capability of forming a lithium compound and an element constituting the first covering layer adjacent thereto. In yet another preferred embodiment of the anode of the invention, the uppermost layer is made of an alloy of a metal having low capability of forming a lithium compound and an element constituting the first covering layer adjacent to the uppermost layer. In the last two embodiments described above, the multilayer cover relaxes changes in volume ascribed to lithium intercalation and deintercalation thereby to suppress cracking and crumbling of the alloy while maintaining the current collecting function of the anode.

Figure 5:
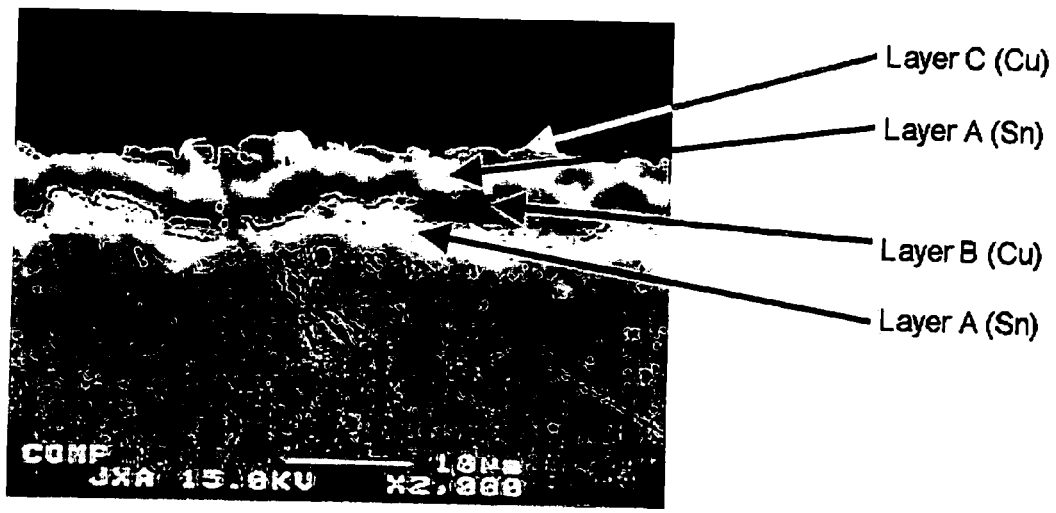
FIG. 5 is an SEM image showing a cross-section of a multilayer cover before heat treatment.

The electrodes according to the above-described embodiments are preferably produced by the following process. A covering layer containing tin, a tin alloy, aluminum or an aluminum alloy (hereinafter referred to as a layer A), a covering layer containing a metal having low capability of forming a lithium compound (hereinafter referred to as a layer B), a layer A that may be the same or different from the above-described layer A, and a covering layer containing a metal having low capability of forming a lithium compound (hereinafter referred to as a layer C) are successively deposited on the surface of a current collector by electrolysis or a dry surface treatment to form a multilayer cover having a four-layer structure. The state in this stage is shown in FIG. 5. In FIG. 5, the current collector is copper foil, the two layers A are tin layers, and the layers B and C are copper layers. The composite composed of the multilayer cover and the current collector is then heat treated. The heat treatment is for diffusing each element constituting each layer. For that purpose, the heat treatment is preferably carried out at 120° to 350° C. for 10 minutes to 24 hours, still preferably at 160° to 250° C. for 10 minutes to 6 hours. While thermal diffusion of an element usually takes much time, elements can be diffused in a short time by reducing the thicknesses of the layers A, B, and C, which brings a great cost merit. The atmosphere of the heat treatment may be an inert gas, such as nitrogen or argon, or air. The heat treatment may be effected in a vacuum at $10^{-1}$ Torr or lower. An inert gas atmosphere or a vacuum condition is preferred for preventing excessive oxidation of the covering layers.

Figure 6:
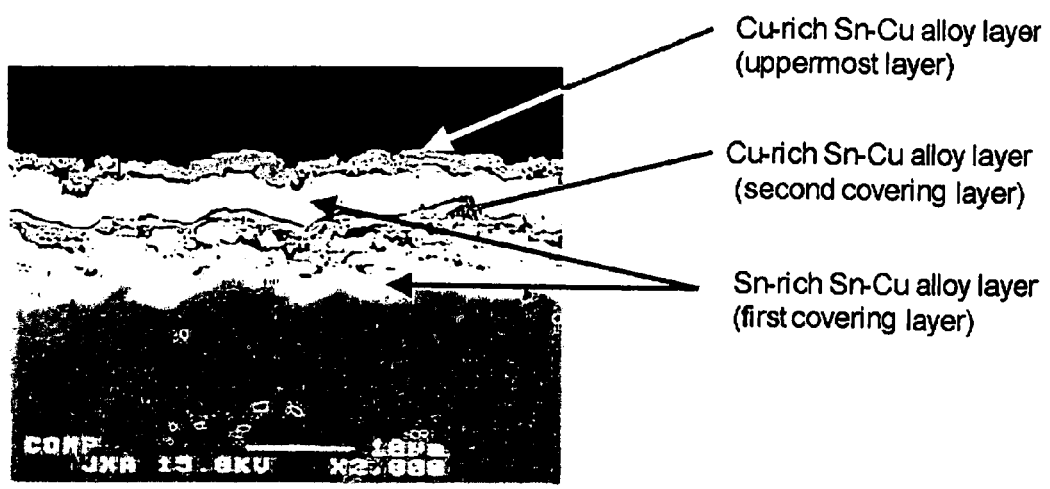
FIG. 6 is an SEM image showing a cross-section of an anode for nonaqueous secondary batteries according to the present invention which is obtained by heat treatment.

Elemental diffusion by heating for a prescribed time period provides an electrode of the above-described embodiments. An example of the electrode of the invention obtained by using the multiple cover shown in FIG. 5 is shown in FIG. 6. In FIG. 6, there is formed a first covering layer of a tin-copper alloy containing tin originated in the layer A adjacent to the current collector and copper originated in the current collector and/or the layer B. Since the elemental diffusion is controllable by varying the heat treating conditions, the tin and copper concentrations in the first covering layer can be controlled as desired. To say more concretely, the first covering layer is a tin-rich tin-copper alloy layer. On this first covering layer is formed a second covering layer of a tin-copper alloy containing copper originated in the layer B and tin originated in the two layers A. The second covering layer is rich in copper. On the second covering layer is formed a first covering layer of a tin-copper alloy containing tin originated in the upper layer A and copper originated in the layers B and C. This upper first covering layer is rich in tin. On the upper first covering layer is formed an uppermost layer of a tin-copper alloy containing tin originated in the upper layer A and copper originated in the layer C. The uppermost layer is rich in copper.

While the boundaries between layers are relatively definitely observable in FIG. 6, elements may diffuse with gradation under some heating conditions, which makes the boundaries between layers obscure. For example, under some conditions including the thickness of each layer constituting the multilayer cover shown in FIG. 5 and the heating conditions, a case may occur in which the electrode as obtained by heat treatment is composed of a first covering layer of a tin-copper alloy and a second covering layer of a copper-rich tin-copper alloy, and the first covering layer has a dual layer structure composed of a copper-rich tin-copper alloy layer and a tin-rich tin-copper alloy layer (see Examples hereinafter given).

Other preferred processes for producing the anode for nonaqueous secondary batteries of the present invention (processes A to C) will then be described taking production of a three-layered anode for instance.

Figure 7:
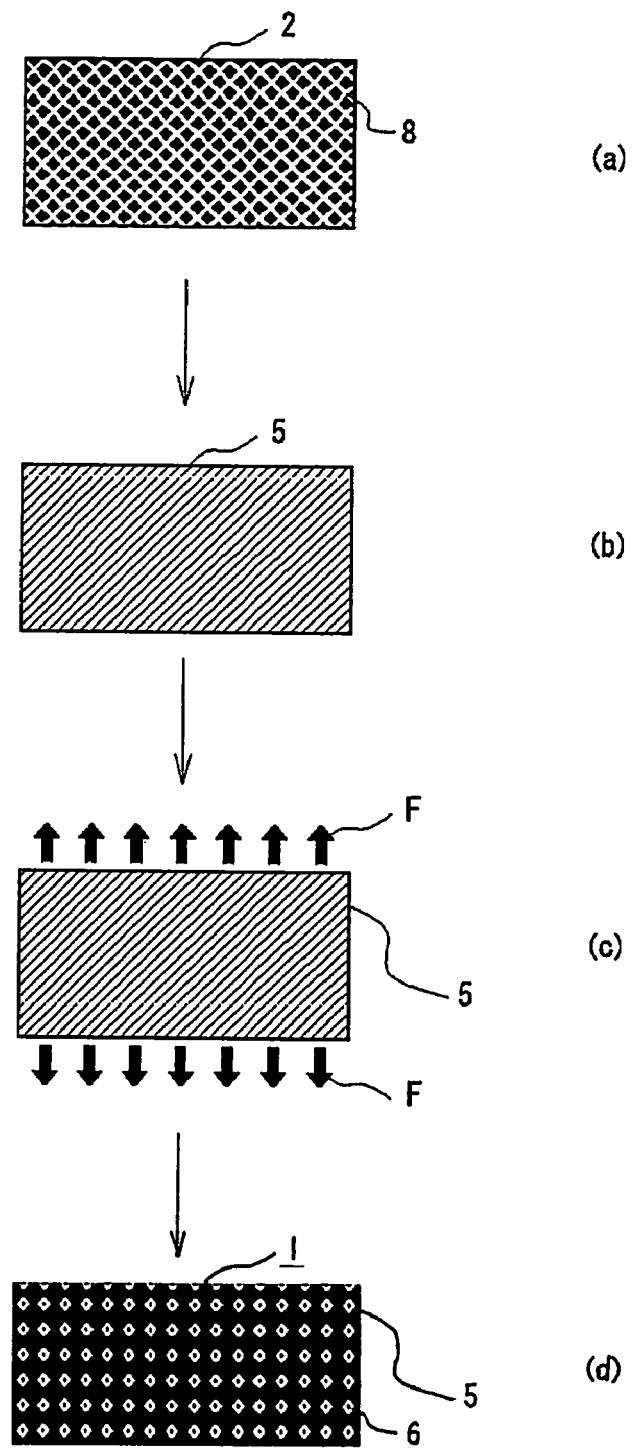
FIG. 7 is a flow chart showing an example of one of the processes according to the invention (process A).

Process A:

The flow chart of process A is shown in FIG. 7. Process A has cutting slits 8 in a current collector 2 as shown in FIG. 7(a). In using copper foil as a current collector, the copper foil is obtained by, for example, electrolysis. The slits 8 are preferably cut in a crossing pattern at intervals of 3 mm or shorter.

The above-described first covering layer, the above-described second covering layer, and the above-described first covering layer are successively deposited on the surface of the current collector 2 by electrolysis or a dry surface treatment to form a multilayer cover 5 having a three-layer structure as shown in FIG. 7(b).

Thereafter, a tensile force F is applied to the resulting composite composed of the current collector and the multilayer cover in the outward directions. As a result, an anode for a nonaqueous secondary battery having holes 6 of 2 mm or smaller in diameter at intervals of 1 mm or shorter in the multilayer cover is obtained.

Process B:

In process B, a multilayer cover having a three-layer structure is formed on a current collector. In using copper foil as a current collector, copper is deposited on a drum by electrolysis of a copper-containing solution to form copper foil for use as a current collector. In the step of electrolysis, the copper deposit is subsequently subjected to a surface treatment, a treatment with glue, an anticorrosion treatment, and the like. In parallel with these treatments, the above-described first covering layer, the above-described second covering layer, and the above-described first covering layer are deposited on the current collector by electrolysis or a dry surface treatment to form a multilayer cover having a three-layer structure.

Thereafter, the resulting composite composed of the current collector and the multilayer cover is irradiated with laser light from the multilayer cover side of the resulting composite. As a result, an anode for a nonaqueous secondary battery having holes of 2 mm or smaller in diameter at intervals of 1 mm or shorter in the multilayer cover is obtained.

Process C:

In process C, a multilayer cover having a three-layer structure is formed on a current collector in the same manner as in process B. In using copper foil as a current collector, the multilayer cover is formed in the step of electrolysis for the preparation of the copper foil.

The resulting composite composed of the current collector and the multilayer cover is pierced by pins from the side of the multilayer cover. As a result, an anode for a nonaqueous secondary battery having holes of 2 mm or smaller in diameter at intervals of 1 mm or shorter in the multilayer cover is obtained.

In processes A to C, the composite may be pressed or rolled from its multilayer cover side either before or after the step of making the holes. By this operation, the above-mentioned second covering layer develops fine and random breaks at its interfaces with the above-mentioned first covering layers at an interval of 2 mm or shorter. As will be understood from Examples given later, the pressing or rolling can also be carried out where the above-mentioned holes are not made.

It is desirable that the composite having the current collector and the three-layered multilayer cover be subjected to the aforementioned heat treatment either before or after the step of making holes. The conditions of the heat treatment are as described supra. The advantages of the heat treatment on the composite are as described supra.

When copper foil is used as a current collector in the above-described processes of the present invention, existing equipment for producing electrolytic copper foil can be made use of as such. In that case, the anode can be produced economically and conveniently. Moreover, since a current collector and a multilayer cover can be formed through a consecutive series of steps, the copper constituting the current collector and the second covering layer is not allowed to form an oxide surface layer. Therefore, even if the first covering layer of tin, etc. has a crack, copper remaining non-oxidized and tin, etc. bind to each other firmly to form, e.g., a Cu—Sn alloy interface, which will prevent tin, etc. from peeling and falling off.

The nonaqueous secondary battery according to the present invention will then be described. The nonaqueous secondary battery of the invention basically has an anode, a cathode, a separator, and a nonaqueous electrolytic solution. The anode is the one according to the present invention. There are no particular limitations imposed on the other elements such as the cathode, separator, and electrolytic solution, and those well-known in the field of nonaqueous secondary batteries such as lithium secondary batteries can be used.

A cathode is produced as follows. A cathode active material and, if necessary, a conductive material and a binder are suspended in an appropriate solvent to prepare a cathode active material mixture, which is applied to a current collector, dried, rolled, and pressed, followed by cutting and punching.

The cathode active material includes conventionally known ones, such as lithium-nickel composite oxide, lithium-manganese composite oxide, and lithium-cobalt composite oxide.

The conductive material that can be used in the cathode includes carbon black, acetylene black, and graphite. The binder to be used includes styrene-butadiene rubber, polytetrafluoroethylene, polyvinylidene fluoride, fluoropolymers, carboxymethyl cellulose, and polyvinyl alcohol. The solvent includes N-methylpyrrolidone and dimethylformamide. The current collector preferably includes aluminum and aluminum alloys.

Preferred separators include nonwoven fabric of synthetic resins and a porous film of polyethylene or polypropylene.

The nonaqueous electrolytic solution used in a lithium secondary battery, for instance, is usually a solution of a lithium salt, a supporting electrolyte, in an organic solvent. The lithium salt includes $LiClO_4$, $LiAlCl_4$, $LiPF_6$, $LiAsF_6$, LiSbF$_6$, LiSCN, LiCl, LiBr, LiI, LiCF$_3$SO$_3$, and LiC$_4$F$_9$SO$_3$. An electrolyte containing LiPF$_6$ is particularly preferred.

Suitable organic solvents include cyclic carbonates, such as ethylene carbonate, propylene carbonate, and vinylene carbonate; acyclic carbonates, such as dimethyl carbonate, diethyl carbonate, and ethylmethyl carbonate; aliphatic carboxylic acid esters, such as methyl formate, ethyl acetate, and methyl propionate; γ-lactones, such as γ-butyrolactone; acyclic ethers, such as 1,2-dimethoxyethane; cyclic ethers, such as tetrahydrofuran; and various aprotic solvents, such as dimethyl sulfoxide, dioxolanes, amides, nitriles, and sulfolanes. A cyclic carbonate/acyclic carbonate mixed solvent which may further contain an aliphatic carboxylic acid ester is still preferred. An ethylene carbonate/ethylmethyl carbonate mixed solvent is particularly preferred.

The shape of the nonaqueous secondary batteries is not particularly limited and may be cylindrical, rectangular, coin-shaped or button-shaped. The nonaqueous secondary batteries of the present invention are suited for applications to, for example, personal digital assistances, portable electronic equipment, and automobiles.

The present invention will now be illustrated in greater detail with reference to Examples,

COMPARATIVE EXAMPLE 1

A first covering layer of tin was electrodeposited to a thickness of 2 μm on a 12 μm thick electrolytic copper foil as a current collector to obtain an anode for a nonaqueous secondary battery.

EXAMPLE 1

Slits were cut in a 30 μm thick electrolytic copper foil as a current collector in a crosswise pattern at 1 mm intervals. A first covering layer of tin was electrodeposited thereon to a thickness of 2 μm. Subsequently, a second covering layer of copper was electrodeposited on the first covering layer to a thickness of 1 μm. Finally, a first covering layer of tin was electrodeposited thereon to a thickness of 2 μm to form a multilayer cover.

A tensile force was applied to the resulting composite composed of the current collector and the multilayer cover in outward directions. An anode for a nonaqueous secondary battery was thus prepared, in which the multilayer cover had holes of 0.05 mm in diameter at 0.1 mm intervals.

EXAMPLE 2

A first covering layer of tin was electrodeposited to a thickness of 2 μm on a 12 μm thick electrolytic copper foil as a current collector. Subsequently, a second covering layer of copper was electrodeposited on the first covering layer to a thickness of 1 μm. Finally, a first covering layer of tin was electrodeposited thereon to a thickness of 2 μm to form a multilayer cover.

The resulting composite composed of the current collector and the multilayer cover was irradiated with laser light from the multilayer cover side. An anode for a nonaqueous secondary battery was thus prepared, in which the multilayer cover had holes of 0.05 mm in diameter at 0.1 mm intervals.

EXAMPLE 3

A first covering layer of tin was electrodeposited to a thickness of 2 μm on a 12 μm thick electrolytic copper foil as a current collector. Subsequently, a second covering layer of copper was electrodeposited on the first covering layer to a thickness of 1 μm. Finally, a first covering layer of tin was electrodeposited thereon to a thickness of 2 μm to form a multilayer cover.

The resulting composite composed of the current collector and the multilayer cover was pierced by pins from the multilayer cover side. An anode for a nonaqueous secondary battery was thus prepared, in which the multilayer cover had holes of 0.5 mm in diameter at 0.1 mm intervals.

EXAMPLES 4 TO 6

The same multilayer cover having holes therein as formed in Examples 1 to 3 was rolled to create fine random breaks in the second covering layer at the interfaces with the first covering layers at 0.1 mm intervals to obtain an anode for a nonaqueous secondary battery.

EXAMPLE 7

An anode for a nonaqueous secondary battery was prepared in the same manner as in Example 1, except that the multilayer cover had a five-layer structure (first covering layer/second covering layer/first covering layer/second covering layer/first covering layer).

EXAMPLE 8

An anode for a nonaqueous secondary battery was prepared in the same manner as in Example 6, except that the composite composed of the current collector and the multilayer cover was heated at 200° C. for 3 hours before making holes in the multilayer cover.

EXAMPLE 9

A first covering layer of tin was electrodeposited to a thickness of 2 μm on a 12 μm thick electrolytic copper foil as a current collector. Subsequently, a second covering layer of copper was electrodeposited on the first covering layer to a thickness of 0.02 μm. Finally, a first covering layer of tin was electrodeposited thereon to a thickness of 2 μm to form a multilayer cover. An anode for a nonaqueous secondary battery was thus prepared.

EXAMPLE 10

A first covering layer of tin was electrodeposited to a thickness of 2 μm on a 12 μm thick electrolytic copper foil as a current collector. Subsequently, a second covering layer of copper was electrodeposited on the first covering layer to a thickness of 1 μm. Finally, a first covering layer of tin was electrodeposited thereon to a thickness of 2 μm to form a multilayer cover. An anode for a nonaqueous secondary battery was thus prepared.

EXAMPLE 11

A first covering layer of tin was electrodeposited to a thickness of 2 μm on a 12 μm thick electrolytic copper foil as a current collector. Subsequently, a second covering layer of nickel was electrodeposited on the first covering layer to a thickness of 1 μm. Finally, a first covering layer of tin was electrodeposited thereon to a thickness of 2 μm to form a multilayer cover. The multilayer cover was rolled to create fine random breaks in the second covering layer at the interfaces with the first covering layers at 0.1 mm intervals. An anode for a nonaqueous secondary battery was thus prepared.

EXAMPLE 12

An anode for a nonaqueous secondary battery was prepared in the same manner as in Example 11, except for replacing nickel as a second covering layer with copper.

EXAMPLE 13

A first covering layer of tin was electrodeposited to a thickness of 2 μm on a 12 μm thick electrolytic copper foil as a current collector. Subsequently, a second covering layer of copper was electrodeposited on the first covering layer to a thickness of 1 μm. A first covering layer of tin was electrodeposited on the second covering layer to a thickness of 2 μm. Finally, a covering layer of copper was electrodeposited thereon to a thickness of 0.02 μm to form a multilayer cover. An anode for a nonaqueous secondary battery was thus prepared.

EXAMPLE 14

An anode for a nonaqueous secondary battery was prepared in the same manner as in Example 13, except that the multilayer cover having a four-layer structure was rolled to create fine random breaks in the second covering layer at the interfaces with the first covering layers at 0.1 mm intervals.

EXAMPLE 15

An anode for a nonaqueous secondary battery was prepared in the same manner as in Example 13, except for changing the thickness of the uppermost copper layer to 0.05 μm.

EXAMPLE 16

An anode for a nonaqueous secondary battery was prepared in the same manner as in Example 15, except that the multilayer cover having a four-layer structure was rolled to make fine random breaks in the second covering layer at the interfaces with the first covering layers at 0.1 mm intervals.

EXAMPLE 17

A covering layer of tin was electrodeposited to a thickness of 2 μm on a 12 μm thick electrolytic copper foil as a current collector. Subsequently, a covering layer of copper was electrodeposited thereon to a thickness of 2 μm. A covering layer of tin was further electrodeposited to a thickness of 2 μm. Finally, a covering layer of copper was electrodeposited thereon to a thickness of 0.05 μm to form a multilayer cover. The resulting composite composed of the multilayer cover and the current collector was heated at 200° C. for 1 hour in an argon atmosphere. Electron microscopic observation of the resulting anode revealed a layer structure made up of a first covering layer of a tin-copper alloy and a second covering layer of a copper-rich tin-copper alloy, the first covering layer having a dual layer structure having a lower copper-rich tin-copper alloy layer and an upper tin-rich tin-copper alloy layer.

EXAMPLE 18

A covering layer of tin was electrodeposited to a thickness of 4 μm on a 12 μm thick electrolytic copper foil as a current collector. Subsequently, a covering layer of copper was electrodeposited thereon to a thickness of 4 μm to form a multilayer cover. The resulting composite composed of the multilayer cover and the current collector was heated at 200° C. for 3 hours in an argon atmosphere. Electron microscopic observation of the resulting anode revealed a layer structure made up of a first covering layer of a tin-copper alloy and a second covering layer made of copper for the most part and containing a tin-copper alloy in part, the first covering layer having a dual layer structure composed of a lower tin-rich tin-copper alloy layer and an upper copper-rich tin-copper alloy layer.

EXAMPLE 19

A covering layer of tin was electrodeposited to a thickness of 2 μm on a 12 μm thick electrolytic copper foil as a current collector. Subsequently, a covering layer of copper was electrodeposited thereon to a thickness of 2 μm. A covering layer of tin was then electrodeposited on the copper layer to a thickness of 2 μm. Finally, a covering layer of copper was electrodeposited thereon to a thickness of 2 μm to form a multilayer cover. The resulting composite composed of the multilayer cover and the current collector was heated at 200° C. for 1 hour in an argon atmosphere. Electron microscopic observation of the resulting anode revealed a layer structure made up of a first covering layer of a tin-copper alloy and a second covering layer made of copper-rich tin-copper alloy, the first covering layer having a dual layer structure composed of a lower copper-rich tin-copper alloy layer and an upper tin-rich tin-copper alloy layer.

EXAMPLE 20

A covering layer of tin was electrodeposited to a thickness of 2 μm on a 12 μm thick electrolytic copper foil as a current collector. Subsequently, a covering layer of copper was electrodeposited thereon to a thickness of 2 μm. A covering layer of tin was then electrodeposited on the copper layer to a thickness of 2 μm. Finally, a covering layer of copper was electrodeposited thereon to a thickness of 5 μm to form a multilayer cover. The resulting composite composed of the multilayer cover and the current collector was heated at 200° C. for 1 hour in an argon atmosphere. Electron microscopic observation of the resulting anode revealed a layer structure made up of a first covering layer of a tin-copper alloy and a second covering layer made of copper-rich tin-copper alloy, the first covering layer having a dual layer structure composed of a lower copper-rich tin-copper alloy layer and an upper tin-rich tin-copper alloy layer.

EXAMPLE 21

A covering layer of tin was electrodeposited to a thickness of 1 μm on a 12 μm thick electrolytic copper foil as a current collector. Subsequently, a covering layer of copper was electrodeposited thereon to a thickness of 1 μm. A covering layer of tin was then electrodeposited on the copper layer to a thickness of 1 μm. Finally, a covering layer of copper was electrodeposited thereon to a thickness of 1 μm to form a multilayer cover. The resulting composite composed of the multilayer cover and the current collector was heated at 200° C. for 30 minutes in an argon atmosphere. Electron microscopic observation of the resulting anode revealed a layer structure made up of a first covering layer of a tin-copper alloy and a second covering layer made of copper-rich tin-copper alloy, the first covering layer having a dual layer structure composed of a lower copper-rich tin-copper alloy layer and an upper tin-rich tin-copper alloy layer.

EXAMPLE 22

A covering layer of tin was electrodeposited to a thickness of 2 μm on a 12 μm thick electrolytic copper foil as a current collector. Subsequently, a covering layer of copper was electrodeposited thereon to a thickness of 2 μm. A covering layer of tin was then electrodeposited on the copper layer to a thickness of 2 μm. Finally, a covering layer of nickel was electrodeposited thereon to a thickness of 2 μm to form a multilayer cover. The resulting composite composed of the multilayer cover and the current collector was heated at 200° C. for 1 hour in an argon atmosphere. Electron microscopic observation of the resulting anode revealed a layer structure made up of a first covering layer of a tin-copper alloy and a second covering layer made of nickel-rich tin-nickel alloy, the first covering layer having a dual layer structure composed of a lower copper-rich tin-copper alloy layer and an upper tin-rich tin-copper alloy layer.

EXAMPLE 23

A covering layer of tin was electrodeposited to a thickness of 2 μm on a 12 μm thick electrolytic copper foil as a current collector. Subsequently, a covering layer of copper was electrodeposited thereon to a thickness of 2 μm. A covering layer of tin was then electrodeposited on the copper layer to a thickness of 2 μm. Finally, a covering layer of chromium was electrodeposited thereon to a thickness of 2 μm to form a multilayer cover. The resulting composite composed of the multilayer cover and the current collector was heated at 200° C. for 1 hour in an argon atmosphere. Electron microscopic observation of the resulting anode revealed a layer structure made up of a first covering layer of a tin-copper alloy and a second covering layer made of chromium-rich tin-chromium alloy, the first covering layer having a dual layer structure composed of a lower copper-rich tin-copper alloy layer and an upper tin-rich tin-copper alloy layer.

EXAMPLE 24

A covering layer of tin was electrodeposited to a thickness of 4 μm on a 12 μm thick electrolytic copper foil as a current collector. Subsequently, a covering layer of copper was electrodeposited thereon to a thickness of 4 μm. A covering layer of tin was then electrodeposited on the copper layer to a thickness of 4 μm. Finally, a covering layer of copper was electrodeposited thereon to a thickness of 4 μm to form a multilayer cover. The resulting composite composed of the multilayer cover and the current collector was heated at 200° C. for 1 hour in an argon atmosphere. Electron microscopic observation of the resulting anode revealed a layer structure made up of a first covering layer of a tin-copper alloy and a second covering layer made of copper-rich tin-copper alloy, the first covering layer having a dual layer structure composed of a lower copper-rich tin-copper alloy layer and an upper tin-rich tin-copper alloy layer.

A nonaqueous secondary battery was assembled as follows using each of the anodes obtained in Examples 1 to 24 and Comparative Example 1. The resulting batteries were evaluated from irreversible capacity (%), initial capacity (mAh/g), and capacity reduction rate (%) in the stage of from 10 to $20\infty$ and of from 100 to $200\infty$. The results obtained are shown in Tables 1 to 3. The charge/discharge conditions were a current density of 0.05 mA/cm$^2$ and a voltage of from 0 to 1.5 V. After a charge and a discharge, each of the anodes of Examples 9 to 16 was observed with an SEM to examine the composition image. It was confirmed that the second covering layer had been formed discontinuously.

Assembly of Nonaqueous Secondary Battery:

The copper foil with a multilayer structure as an anode and a metallic lithium as a cathode (counter electrode) were placed to face each other with a separator between them and assembled into a nonaqueous secondary battery in a usual manner using an LiPF$_6$ solution in a mixture of ethylene carbonate and diethyl carbonate (1:1 by volume) as a nonaqueous electrolytic solution.

Irreversible Capacity:

Represented by equation shown below, that is, the part of the charge capacity that is not discharged and remains in the active material.

Irreversible capacity (%)=[1−(first discharge capacity/first charge capacity)]×100

Initial Capacity:

Representing the first discharge capacity per weight (g) of the active material inclusive of the first and the second covering layers.

Capacity Reduction Rate:

(1) $10\text{-}20\infty$

The capacity at the 10th cycle was taken as a standard. The capacity reduction rate ($10\text{-}20\infty$) is the percent of the reduction in capacity per cycle from the 10th cycle up to the 20th cycle to the capacity at the 10th cycle.

(2) $100\text{-}200\infty$

The capacity at the 10th cycle was taken as a standard. The capacity reduction rate ($100\text{-}200\infty$) is the percent of the reduction in capacity per cycle from the 100th cycle up to the 200th cycle to the capacity at the 10th cycle.

TABLE 1

| Sample | | Irreversible Capacity (%) | Initial Capacity (%) | Capacity Reduction Rate (%) | |
|---|---|---|---|---|---|
| | | | | $10\text{-}20\infty$ | $100\text{-}200\infty$ |
| Compara. Example 1 | Sn plating | 50 | 900 | 15.0 | — |
| Example 1 | 3-layer plating (Sn/Cu/Sn) + slitted copper foil | 25 | 450 | 0.05 | 0.2 |
| Example 2 | 3-layer plating (Sn/Cu/Sn) + laser treatment | 30 | 410 | 0.05 | 0.2 |
| Example 3 | 3-layer plating (Sn/Cu/Sn) + pinholes | 30 | 370 | 0.05 | 0.2 |
| Example 4 | 3-layer plating (Sn/Cu/Sn) + slitted copper foil + rolling | 10 | 450 | 0.05 | 0.05 |
| Example 5 | 3-layer plating (Sn/Cu/Sn) + laser treatment + rolling | 10 | 410 | 0.05 | 0.05 |
| Example 6 | 3-layer plating (Sn/Cu/Sn) + pinholes + rolling | 10 | 370 | 0.05 | 0.05 |
| Example 7 | 5-layer plating (Sn/Cu/Sn/Cu/Sn) + slitted copper foil + rolling | 12 | 440 | 0.05 | 0.05 |
| Example 8 | 3-layer plating + heat treatment + pinholes + rolling | 10 | 330 | 0 | 0.01 |

TABLE 2

| Sample | | Irreversible Capacity (%) | Initial Capacity (%) | Capacity Reduction Rate (%) | |
|---|---|---|---|---|---|
| | | | | 10-20∞ | 100-200∞ |
| Example 9 | 2-layer plating (Sn/Cu) | 35 | 550 | 0.2 | 0.2 |
| Example 10 | 3-layer plating (Sn/Cu/Sn) | 30 | 510 | 0.1 | 0.1 |
| Example 11 | 3-layer plating (Sn/Ni/Sn) + rolling | 25 | 510 | 0.1 | 0.1 |
| Example 12 | 3-layer plating (Sn/Cu/Sn) + rolling | 25 | 500 | 0.1 | 0.1 |
| Example 13 | 4-layer plating (Sn/Cu/Sn/Cu)(uppermost layer: ultrathin (0.02 μm) Cu | 15 | 450 | 0.07 | 0.07 |
| Example 14 | 4-layer plating (Sn/Cu/Sn/Cu) + rolling (uppermost layer: ultrathin (0.02 μm) Cu | 10 | 460 | 0.07 | 0.07 |
| Example 15 | 4-layer plating (Sn/Cu/Sn/Cu)(uppermost layer: ultrathin (0.05 μm) Cu | 17 | 410 | 0.07 | 0.07 |
| Example 16 | 4-layer plating (Sn/Cu/Sn/Cu) + rolling (uppermost layer: ultrathin (0.05 μm) Cu | 12 | 420 | 0.07 | 0.07 |

TABLE 3

| Sample | | Irreversible Capacity (%) | Initial Capacity (%) | Capacity Reduction Rate (%) | |
|---|---|---|---|---|---|
| | | | | 10-20∞ | 100-200∞ |
| Example 17 | Sn—Cu alloy 1st layer + Cu-rich Sn—Cu alloy 2nd layer | 7 | 550 | 0.02 | 0.02 |
| Example 18 | Sn—Cu alloy 1st layer + Cu 2nd layer containing Sn—Cu alloy in part | 7 | 550 | 0.02 | 0.02 |
| Example 19 | Sn—Cu alloy 1st layer + Cu-rich Sn—Cu alloy 2nd layer | 7 | 550 | 0.02 | 0.02 |
| Example 20 | Sn—Cu alloy 1st layer + Cu-rich Sn—Cu alloy 2nd layer | 7 | 550 | 0.02 | 0.01 |
| Example 21 | Sn—Cu alloy 1st layer + Cu-rich Sn—Cu alloy 2nd layer | 7 | 550 | 0.02 | 0.02 |
| Example 22 | Sn—Cu alloy 1st layer + Ni-rich Sn—Ni alloy 2nd layer | 7 | 550 | 0.02 | 0.02 |
| Example 23 | Sn—Cu alloy 1st layer + Cr-rich Sn—Cr alloy 2nd layer | 7 | 550 | 0.02 | 0.02 |
| Example 24 | Sn—Cu alloy 1st layer + Cu-rich Sn—Cu alloy 2nd layer | 7 | 550 | 0.04 | 0.04 |

INDUSTRIAL APPLICABILITY

The anode for nonaqueous secondary batteries of the present invention has a prolonged electrode life and a markedly improved energy density per unit volume and weight. A nonaqueous secondary battery using the anode therefore exhibits high capacity, excellent charge and discharge characteristics, and excellent cycle life characteristics. The process of the present invention enables manufacturers to produce the anode at low cost and with convenience by making use of existing equipment.

The invention claimed is:

1. An anode for a nonaqueous secondary battery comprising a current collector, a first covering layer containing tin, a tin alloy, aluminum or an aluminum alloy formed on the current collector, and a second covering layer containing a metal having low capability of forming a lithium compound formed on the first covering layer,
   which further comprises an additional first covering layer formed on the second covering layer to form a multilayer cover having a three-layer structure, the additional first covering layer being the same as or different from the first covering layer formed on the current collector, and
   wherein the multilayer cover has one or more sets of a second covering layer and a first covering layer formed on the three-layer structure with the first covering layer of every set as an upper layer.

2. The anode for a nonaqueous secondary battery according to claim 1, wherein the multilayer cover has holes of 2 mm or smaller in diameter at intervals of 1 mm or shorter.

3. The anode for a nonaqueous secondary battery according to claim 1, wherein the first covering layer has a thickness of 0.5 to 50 μm, and the second covering layer has a thickness of 0.02 to 50 μm.

4. The anode for a nonaqueous secondary battery according to claim 1, wherein the second covering layer has fine random breaks at intervals of 2 mm or smaller.

5. The anode for a nonaqueous secondary battery according to claim 1, wherein the metal having low capability of forming a lithium compound is copper, iron, cobalt, chromium or nickel.

6. The anode for a nonaqueous secondary battery according to claim 1, wherein the first covering layer comprises an alloy formed between tin or aluminum and an element constituting the second covering layer and/or an element constituting the current collector.

7. The anode for a nonaqueous secondary battery according to claim 1, wherein the second covering layer comprises copper, iron, cobalt, chromium, nickel or an alloy formed between copper, iron, cobalt, chromium or nickel and an element constituting the first covering layer adjacent to the second covering layer.

8. An anode for a nonaqueous secondary battery comprising a current collector, a first covering layer containing tin, a tin alloy, aluminum or an aluminum alloy formed on the current collector, and a second covering layer containing a metal having low capability of forming a lithium compound formed on the first covering layer, which further comprises an additional first covering layer formed on the second covering layer to form a multilayer cover having a three-layer structure, the additional first covering layer being the same as or different from the first covering layer formed on the current collector, and wherein the multilayer cover has a covering layer containing a metal having low capability of forming a lithium compound formed on the three-layer structure as an uppermost layer.

9. The anode for a nonaqueous secondary battery according to claim 8, wherein the uppermost layer has a thickness of 0.01 to 20 μm.

10. The anode for a nonaqueous secondary battery according to claim 8, wherein the uppermost covering layer comprises copper, iron, cobalt, chromium, nickel or an alloy formed between copper, iron, cobalt, chromium or nickel and an element constituting the first covering layer adjacent to the uppermost covering layer.

11. The anode for a nonaqueous secondary battery according to claim 8, wherein the multilayer cover has holes of 2 mm or smaller in diameter at intervals of 1 mm or shorter.

12. The anode for a nonaqueous secondary battery according to claim 8, wherein the first covering layer has a thickness of 0.5 to 50 μm, and the second covering layer has a thickness of 0.02 to 50 μm.

13. The anode for a nonaqueous secondary battery according to claim 8, wherein the second covering layer has fine random breaks at intervals of 2 mm or smaller.

14. The anode for a nonaqueous secondary battery according to claim 8, wherein the metal having low capability of forming a lithium compound is copper, iron, cobalt, chromium or nickel.

15. The anode for a nonaqueous secondary battery according to claim 8, wherein the first covering layer comprises an alloy formed between tin or aluminum and an element constituting the second covering layer and/or an element constituting the current collector.

16. The anode for a nonaqueous secondary battery according to claim 8, wherein the second covering layer comprises copper, iron, cobalt, chromium, nickel or an alloy formed between copper, iron, cobalt, chromium or nickel and an element constituting the first covering layer adjacent to the second covering layer.

* * * * *